2,328,386

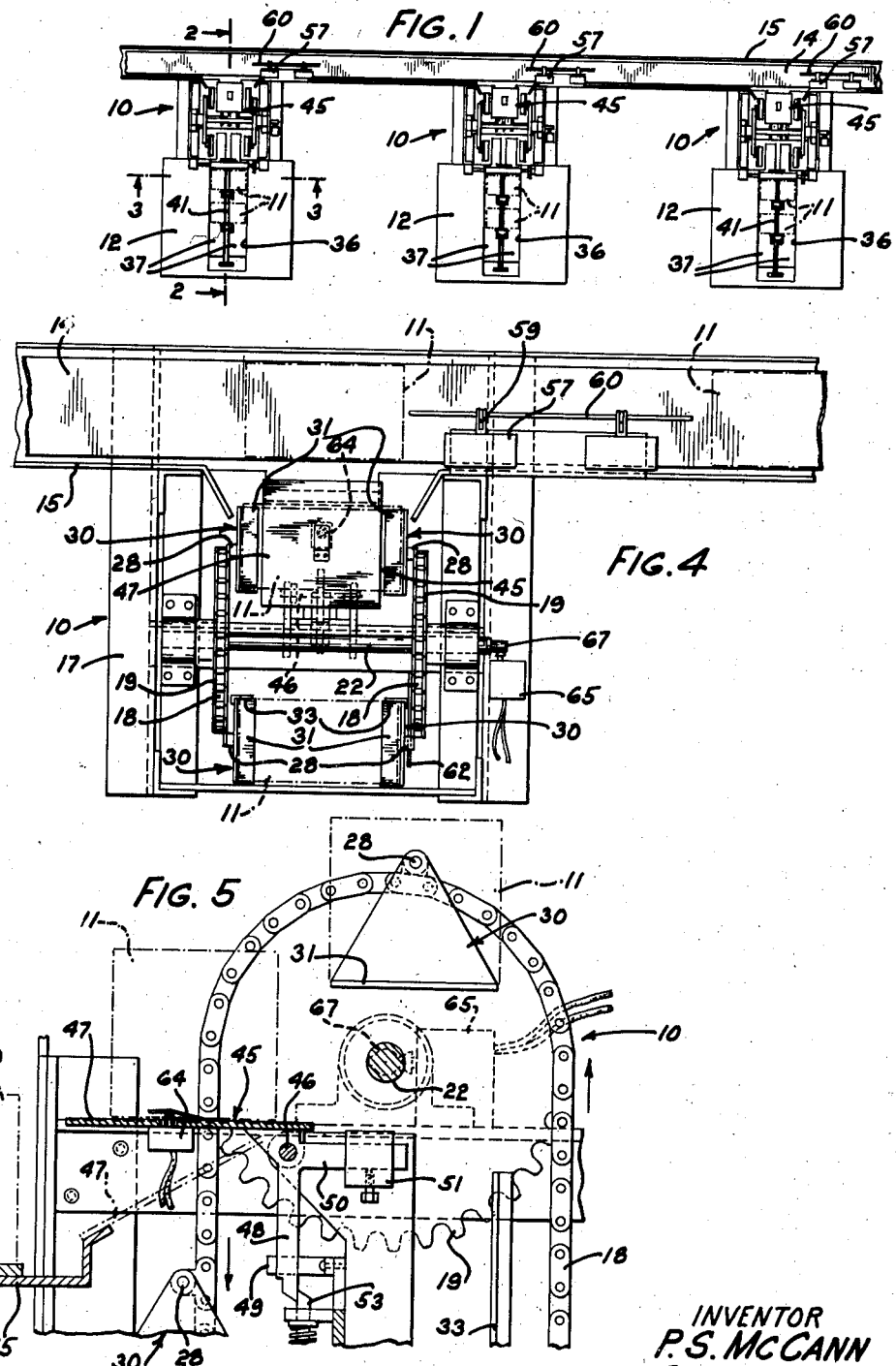
Aug. 31, 1943.  P. S. McCANN  2,328,386
CONVEYER SYSTEM
Filed July 10, 1940  3 Sheets-Sheet 1
INVENTOR
P. S. McCANN
BY Emery Robinson
ATTORNEY Aug. 31, 1943.  P. S. McCANN  2,328,386
CONVEYER SYSTEM
Filed July 10, 1940  3 Sheets-Sheet 2
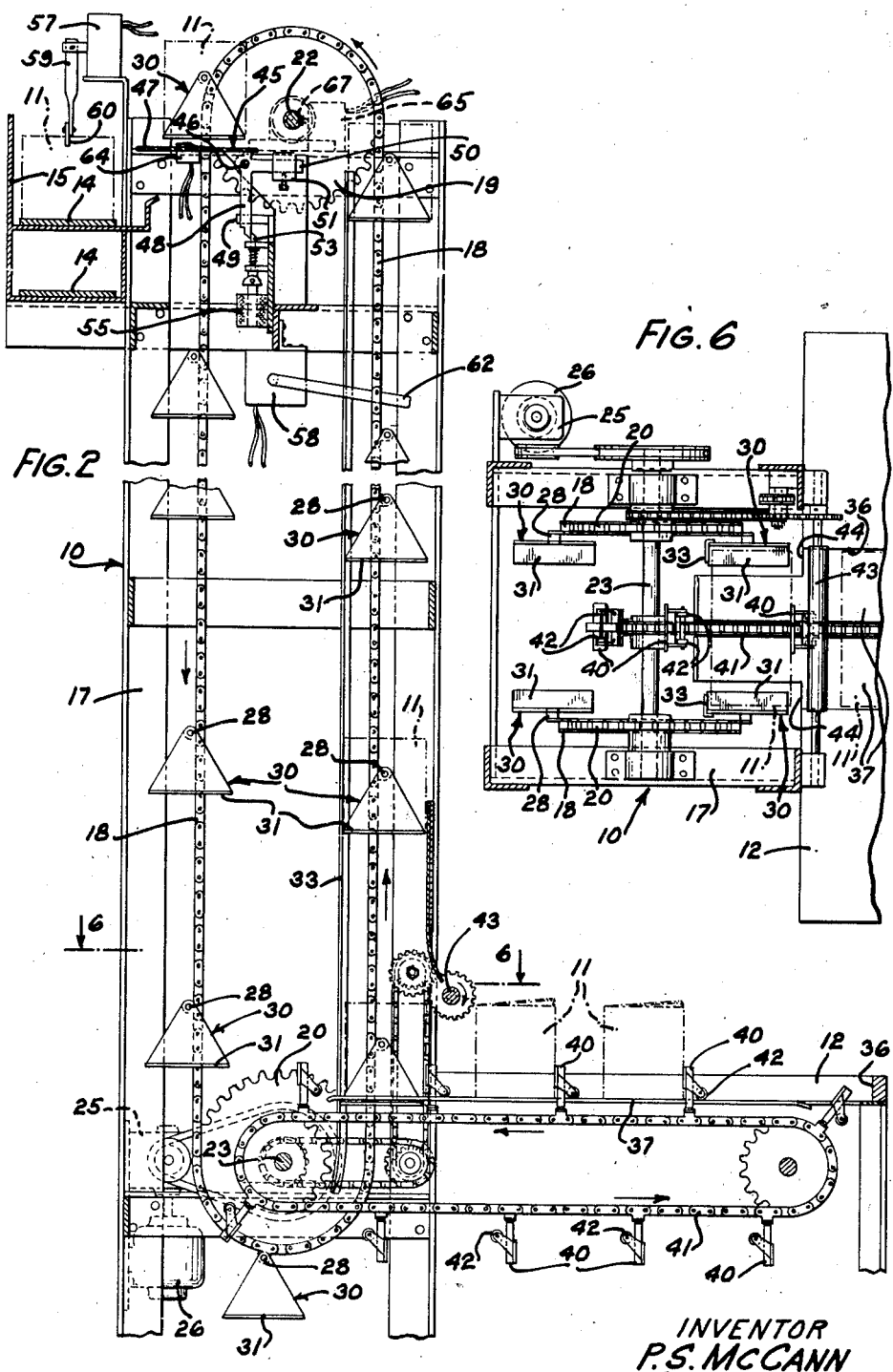
INVENTOR
P. S. McCANN
BY Emery Robinson
ATTORNEY Aug. 31, 1943.  P. S. McCANN  2,328,386
CONVEYER SYSTEM
Filed July 10, 1940    3 Sheets-Sheet 3
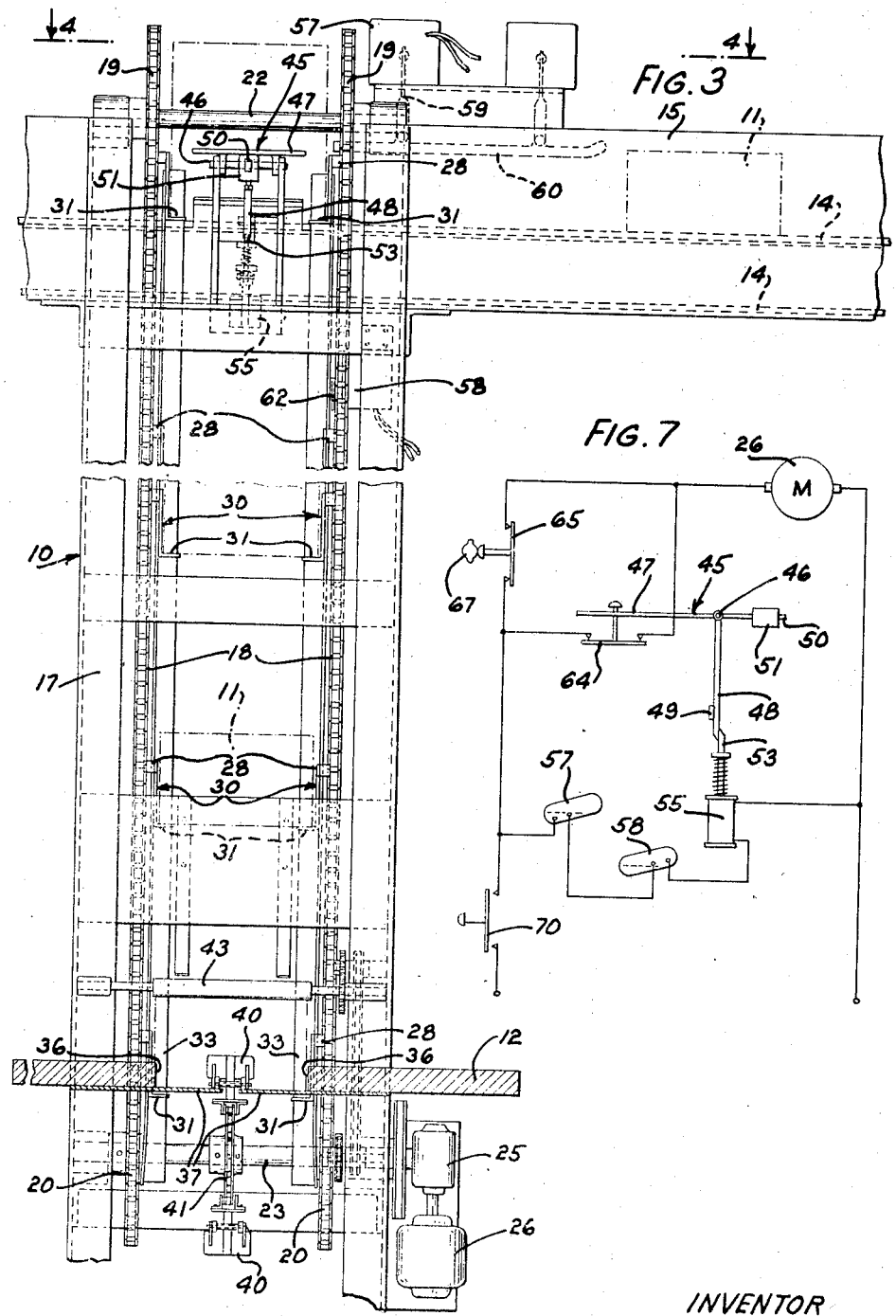
INVENTOR
P. S. McCANN
BY Emery Robinson
ATTORNEY Patented Aug. 31, 1943

UNITED STATES PATENT OFFICE 2,328,386

CONVEYER SYSTEM

Paul S. McCann, La Grange, Ill., assignor to Western Electric Company, Incorporated, New York, N. Y., a corporation of New York Application July 10, 1940, Serial No. 344,684

17 Claims. (Cl. 198—21)

This invention relates to conveyer systems, and more particularly to conveyer systems of the type in which articles are conveyed from a plurality of separate work stations and are delivered to a common main conveyer.

Objects of the invention are to provide, in a conveyer system of the type referred to, simple and reliable mechanism for controlling the delivery of the articles to the main conveyer, whereby collisions between the articles are avoided.

In accordance with one embodiment of the invention, there is provided a conveyer system in which a continuously moving conveyer belt is arranged to receive articles or packages from a series of separate conveyers or elevators spaced along the conveyer belt. Mechanism is provided for controlling the transfer of packages from the several elevators to the conveyer belt, whereby jamming or piling up of packages on the conveyer belt is prevented.

A preferred embodiment of the invention is illustrated in the accompanying drawings, in which Fig. 1 is a plan view of a conveyer system embodying the invention;

Fig. 2 is an enlarged vertical sectional view taken on line 2—2 of Fig. 1;

Fig. 3 is an enlarged vertical sectional view taken on line 3—3 of Fig. 1;

Fig. 4 is an enlarged plan view of one of the elevators;

Fig. 5 is an enlarged fragmentary sectional view similar to the upper portion of Fig. 2, but showing the elevator carriers advanced from the positions in which they are shown in Fig. 2;

Fig. 6 is a fragmentary plan section taken on line 6—6 of Fig. 2, and

Fig. 7 is a wiring diagram of the electrical control mechanism employed at each of the elevators.

As illustrated somewhat schematically in Fig. 1, the conveyer system comprises a series of separate conveyers or elevators 10, 10 each adapted to receive packages 11, 11 from an associated work table or packing bench 12 and carry the same to a common overhead conveyer belt 14. This conveyer belt travels in a sheet metal channel 15 and is adapted to be continuously driven by suitable means (none shown) so as to convey the packages to a shipping platform or to any other desired destination.

The several elevators are all identical in construction and operation and, therefore, a description of one of them will suffice. Each elevator comprises a structural steel shaft 17 within which a pair of endless chains 18, 18 are arranged to travel around upper sprocket wheels 19, 19 and lower sprocket wheels 20, 20. The two upper sprocket wheels are attached to a rotary shaft 22 and the two lower sprocket wheels are fixed to a driven shaft 23. The shaft 23 may be driven by any suitable means, preferably through a speed reducer 25 driven by an electric motor 26.

The elevator chains are each equipped with a plurality of equidistantly spaced lugs 28 upon which package carriers 30 are pivotally suspended. These carriers comprise horizontal portions 31 which project inwardly so that the carriers on one chain cooperate with opposed carriers on the other chain to provide shelf-like supports for receiving and supporting the packages 11, as illustrated in the drawings. Vertical guide rails 33, 33 are provided for guiding the package carriers during their upward movement so that the package supporting shelves 31 thereof are maintained in substantially horizontal positions.

It will be noted that the overhead conveyer belt 14 travels along the upper ends of the elevators on the downwardly moving sides of the elevating chains, and the packing benches 12 are disposed on the upwardly moving sides of the elevator chains near the lower ends of the elevators. Each elevator has a separate packing bench associated therewith, but since the several benches and associated mechanisms are of identical construction, a description of one of them will suffice. The top of each bench has a slot 36 which extends longitudinally of the bench top and in line with the elevator carriers. This slot together with a pair of plates 37, 37 attached to the underside of the bench top forms a trough or guideway along which the packages are adapted to be advanced toward the elevator by means of a series of pusher bars 40, 40 attached to a loading chain 41 disposed below the bench top (Fig. 2). The plates 37 are spaced apart to permit the pusher bars to pass therebetween and the pusher bars are equipped with thrust rollers 42, 42 adapted to ride along the upper surfaces of the plates.

The pusher bars are adapted to advance the packages along the horizontal plates 37 and onto the inner end portions thereof which extend into the elevator shaft between the upwardly moving sides of the two elevator chains 18. The inner end portions of the plates are notched, as indicated at 44 (Fig. 6), to permit the passage of the upwardly moving elevator carriers 30, and it will be noted that the ends of the packages 11 overlap the notched portions of the plates and are thus automatically lifted from the plates by the upwardly moving carriers. The loading chain 41 is driven from the same shaft 23 which drives the elevator chains, whereby the movement of the pusher bars 40 is synchronized with the movement of the upwardly moving elevator carriers. Thus, the loading chain pusher bars advance the packages, one at a time, onto the notched inner end portions of the plates 37 in timed relation with the upwardly moving elevator carriers 30, which automatically lift the packages from the plates and carry them upwardly for delivery to the overhead conveyer belt 14. A continuously driven horizontal roller 43 is provided for closing the covers of the packages as they are advanced along the plates 37.

Since the several elevators all deliver packages to the same conveyer belt, each elevator has associated therewith mechanism for controlling the transfer of packages from the elevator carriers to the conveyer belt so that they will not interfere with other packages on the conveyer belt which may have been previously delivered thereto by other elevators. This mechanism comprises a tiltable transfer platform 45, which is pivotally mounted upon a horizontal pin 46 near the upper end of the elevator and comprises a substantially flat and normally horizontal plate 47 disposed between the downwardly moving sides of the elevator chains above the level of the conveyer belt. The transfer platform further comprises a depending arm 48 adapted to engage a fixed stop bracket 49. A rearwardly extending arm 50 of the platform carries an adjustable counter-weight 51 for holding arm 48 against stop 49 so that the platform plate 47 is normally maintained in a horizontal position. However, the weight of a package 11, when placed upon the platform plate, is sufficient to overcome the counter-weight and tilt the platform plate from its horizontal position to the inclined position indicated in dotted lines in Fig. 5, whereby the package is caused to slide down the platform plate and onto the continuously moving conveyer belt 14.

A spring-pressed latch 53 normally cooperates with the depending arm 48 of the platform to prevent tilting of the platform under the weight of a package placed thereon. Thus, the package is retained on the platform plate 47 until the latch is retracted. An electromagnet or solenoid 55 is provided for retracting the latch and the energizing circuit for this solenoid is controlled by two mercury switches 57 and 58. Switch 57 is suitably mounted above the conveyer belt 14. It is normally closed and adapted to be opened by oncoming packages on the conveyer belt as they approach the point of delivery of packages from the transfer platform to the conveyer belt. The oncoming packages engage and elevate a horizontal shoe 60, pivotally connected to an operating arm 59 of the switch 57, thereby opening the switch. This de-energizes the latch retracting solenoid 55 and, therefore, the latch prevents tilting of the platform to discharge a package onto the conveyer belt. After the package on the conveyer belt has passed beyond the point of delivery of packages from the transfer platform, switch 57 automatically closes and thus conditions the energizing circuit of the latch retracting solenoid so that upon the closing of switch 58 this circuit is established. The solenoid will then retract the latch and thereby permit tilting of the platform under the weight of a package thereon, whereby the package will be discharged onto the conveyer belt.

The switch 58 is normally open and its function is to synchronize the tilting of the discharge platform with the elevator chains so as to insure that the elevator carriers 30 will not interfere with the discharge of the packages from the transfer platform. Therefore, switch 58 is arranged so that its operating arm 62 is adapted to be actuated by the lugs 28 on one of the elevator chains. The arrangement is such that the switch 58 is closed only at times when the elevator carriers are positioned so as not to interfere with the discharge of packages from the transfer platform.

The electrical operating circuit for the elevator motor 26 is controlled by two switches 64 and 65 which are connected in parallel, as shown in Fig. 7. Both of these switches are normally closed. Switch 64 is attached to the underside of the platform plate 47. Its operating button projects through the platform plate and is adapted to be depressed by a package when placed upon the platform. This switch is thereby opened, but the elevator motor continues to run until switch 65 is also opened. This latter switch is mounted adjacent the upper sprocket shaft 22 and is adapted to be opened by a cam 67 fixed to this shaft. The function of switch 65 is to permit the elevator chains to travel sufficiently to close switch 58 after each carrier passes by the transfer platform. The closing of switch 58 before stopping the elevator chains is essential in order to insure that the energizing circuit of latch retracting solenoid 55 is conditioned to be closed as soon as the conveyer belt 14 is free to receive a package from the transfer platform.

The electrical circuit for the electrical control mechanisms at one of the elevators is illustrated diagrammatically in Fig. 7, and it will be understood that a similar electrical control circuit is provided for each of the elevators. Included in each elevator control circuit is a starting switch 70 by means of which the several elevators may be individually started or stopped at will. The closing of the starting switch establishes the elevator motor circuit through either of the normally closed switches 64 and 65. The elevator chains are thus driven by the motor in the direction indicated by the arrows in Fig. 2, and the loading chain 41 is simultaneously driven in synchronism with the elevator chains. Packages placed in the table groove 36 are automatically loaded onto the elevator carriers 30, which carry the packages upwardly and place them, one at a time, upon the transfer platform 45, as explained above. Each package, when placed on the transfer platform, opens the normally closed switch 64 in the elevator motor circuit. The elevator motor continues to run, however, on electrical current supplied thereto through normally closed switch 65, which, as mentioned above, permits the elevator chains to travel sufficiently to close switch 58 after each set of package carriers passes by the transfer platform. The closing of switch 58 establishes the electrical energizing circuit for latch retracting solenoid 55, providing that switch 57 is also closed, as is the case when there is no package on the conveyer belt at or approaching the point where the transfer platform discharges the packages onto the belt. The solenoid, upon being energized, retracts the latch 53, whereupon the transfer platform is tilted by the weight of the package and the package is thereby discharged onto the conveyer belt. However, since the energization of the latch retracting solenoid requires the closing of both switches 57 and 58, no tilting of the transfer platform to discharge the package can occur unless there are no packages on the conveyer belt opposite the transfer platform, since such packages would hold open the switch 57. Thus jamming or piling up of packages on the conveyer belt is positively prevented.

Normally closed switch 65 in the elevator motor circuit is momentarily opened by cam 67 simultaneously with each closing of solenoid controlling switch 58. However, since the stopping of the elevator motor requires the opening of both switches 64 and 65, the movement of the elevator is not interrupted by the momentary opening of switch 65 unless switch 64 is, at the same time, held open by a package previously placed upon the transfer platform. This occurs only when the transfer platform fails, for any reason, to discharge the package upon the closing of switch 58. In such instances, the elevator automatically stops upon the opening of switch 65 and remains at rest until the package is discharged. This prevents the piling up of packages upon the transfer platform. Switch 58 is arranged so that it remains closed while the elevator is at rest pending the discharge of a package from the transfer platform, whereby the energizing circuit for the latch retracting solenoid is conditioned to be closed immediately upon the closing of switch 57. Thus, the transfer platform is caused to discharge the package as soon as the conveyer belt is ready to receive it. The discharge of the package from the transfer platform permits switch 64 to close and thereby re-start the elevator. Switch 58 re-opens before the next set of carriers 30 places another package upon the transfer platform and remains open until the carriers are again positioned so as not to interfere with the discharge of the package from the transfer platform.

The transfer of packages from each of the several elevators to the main conveyer belt is controlled in the same manner as described above. It will be obvious, therefore, that jamming or piling up of packages on the conveyer belt and transfer platforms is positively prevented.

It should be understood that the invention is not limited to the particular embodiments thereof herein illustrated and described, except insofar as is defined by the appended claims.

What is claimed is:

1. In a conveyer system, a main conveyer, a second conveyer for conveying articles toward said main conveyer, a transfer platform for receiving articles from the second conveyer, said platform being movable to discharge said articles onto said main conveyer, and means controlled by articles on the main conveyer for controlling the movement of said transfer platform.

2. In a conveyer system, a main conveyer, an elevator for conveying articles to said main conveyer, transfer means for transferring articles from said elevator to said main conveyer, latch means normally restraining said transfer means, and means under the joint control of said elevator and articles on the main conveyer for releasing said latch means.

3. In a conveyer system, a main conveyer, a second conveyer for conveying articles to said main conveyer, a hinged transfer platform for receiving articles from said second conveyer, said platform being tiltable to discharge said articles onto said main conveyer, and means controlled by articles on the main conveyer for controlling the tilting of said transfer platform.

4. In a conveyer system, a main conveyer, a second conveyer for conveying articles to said main conveyer, a hinged platform for transferring articles from said second conveyer to said main conveyer, latch means normally preventing tilting of said platform, and means under the control of articles being conveyed by the main conveyer for releasing said latch means to permit tilting of said platform to discharge articles therefrom onto said main conveyer.

5. In a conveyer system, a main conveyer, a second conveyer for conveying articles to said main conveyer, a tiltable platform for transferring articles from said second conveyer to said main conveyer, said second conveyer comprising a series of carriers adapted to place the articles upon said platform, and means under the control of articles on said main conveyer for controlling the discharge of articles from said platform.

6. In a conveyer system, a main conveyer, an elevator cooperating therewith comprising a series of carriers for articles to be delivered to said main conveyer, a transfer platform for receiving articles from said carriers for delivery to said main conveyer, means under the control of articles received by said platform for controlling said elevator, and means under the control of said elevator for controlling the delivery of articles from said transfer platform to said main conveyer.

7. In a conveyer system, a main conveyer, an elevator for conveying articles to said main conveyer, said elevator comprising a series of carriers each adapted to support an article, a transfer platform for receiving articles from said carriers for delivery to said main conveyer, means under the control of articles received by said platform for controlling said elevator, and means under the joint control of said elevator and articles on the main conveyer for controlling the delivery of articles from said transfer platform to said main conveyer.

8. In a conveyer system, a main conveyer, a plurality of elevators for conveying articles to said main conveyer, a transfer platform associated with each elevator for transferring articles therefrom to said main conveyer, and means under the control of articles on the main conveyer for controlling the operation of the several transfer platforms, whereby piling up of articles on the main conveyer is prevented.

9. In a conveyer system, a plurality of separate article conveying elevators, a conveyer belt for receiving articles from said elevators, a hinged platform at each elevator for receiving articles therefrom for delivery to said conveyer belt, said platform being tiltable under the weight of an article when placed thereon by the elevator, whereby the article is discharged onto said conveyer belt, and latch means under the control of articles on the conveyer belt for preventing tilting of said platform.

10. In a conveyer system, a main conveyer, a second conveyer for conveying articles to the main conveyer, transfer means for transferring articles from the second conveyer to said main conveyer, releasable means normally restraining said transfer means, and means under the joint control of the second conveyer and articles on the main conveyer for releasing said restraining means.

11. In a conveyer system, a main conveyer, a second conveyer for delivering articles to said main conveyer, a hinged transfer platform for receiving articles from said second conveyer, said platform being tiltable to discharge said articles onto said main conveyer, and means under the joint control of said second conveyer and articles on the main conveyer for controlling the tilting of said transfer platform.

12. In a conveyer system, a main conveyer, a second conveyer for conveying articles to said main conveyer, a transfer mechanism for receiving articles from said second conveyer for delivery to said main conveyer, means under the control of articles received by the transfer mechanism for controlling the second conveyer, and means under the control of said second conveyer for controlling the delivery of articles from said transfer mechanism to said main conveyer.

13. In a conveyer system, a main conveyer, a second conveyer for conveying articles to said main conveyer, a transfer mechanism for receiving articles from said second conveyer for delivery to said main conveyer, means under the control of articles received by the transfer mechanism for controlling the second conveyer, and means under the control of articles on the main conveyer for controlling the delivery of articles from said transfer mechanism to said main conveyer.

14. In a conveyer system, a main conveyer, a second conveyer for conveying articles to said main conveyer, a transfer mechanism for receiving articles from said second conveyer for delivery to said main conveyer, means under the control of articles received by the transfer mechanism for controlling the second conveyer, and means under the joint control of said second conveyer and articles on the main conveyer for controlling the delivery of articles from the transfer mechanism to said main conveyer.

15. In a conveyer system, a main conveyer, a second conveyer for conveying articles to the main conveyer, a transfer mechanism for receiving articles from the second conveyer for delivery to the main conveyer, a series of spaced elements on said second conveyer, and means under the control of said elements for controlling the delivery of articles from said transfer mechanism to said main conveyer.

16. In a conveyer system, a main conveyer, a second conveyer for conveying articles to the main conveyer, a transfer mechanism for receiving articles from the second conveyer for delivery to the main conveyer, a series of spaced elements on said second conveyer, and means under the joint control of said elements and articles on the main conveyer for controlling the delivery of articles from said transfer mechanism to said main conveyer.

17. In a conveyer system, a main conveyer, a second conveyer for conveying articles to the main conveyer, a transfer mechanism for receiving articles from the second conveyer for delivery to the main conveyer, a series of switch operating elements spaced along the second conveyer and movable therewith, a switch arranged to be operated by said elements, a second switch adapted to be operated by articles on the main conveyer, and means under the joint control of the two switches for controlling the delivery of articles from the transfer mechanism to said main conveyer.

PAUL S. McCANN.